United States Patent [19]

Leiber et al.

[11] Patent Number: 4,856,610

[45] Date of Patent: Aug. 15, 1989

[54] SYSTEM FOR CONTROLLING AT LEAST ONE VARIABLE INFLUENCING THE DRIVE TORQUE OF AN INTERNAL COMBUSTION ENGINE OF A MOTOR VEHICLE

[75] Inventors: Heinz Leiber, Oberriexingen; Hans-Joachim Ohnemüller, Reutlingen; Klaus Kastner, Stuttgart, all of Fed. Rep. of Germany

[73] Assignee: Daimler-Benz Aktiengesellschaft, Stuttgart, Fed. Rep. of Germany

[21] Appl. No.: 237,322

[22] Filed: Aug. 29, 1988

[30] Foreign Application Priority Data

Aug. 27, 1987 [DE] Fed. Rep. of Germany ....... 3728573

[51] Int. Cl.$^4$ ............................................. B60K 31/00
[52] U.S. Cl. ................................... 180/197; 123/361; 364/426.03
[58] Field of Search ................... 180/197; 364/426.03; 123/351, 361

[56] References Cited

U.S. PATENT DOCUMENTS 4,785,904 11/1988 Leiber et al. .................... 180/197

Primary Examiner—John A. Pekar
Attorney, Agent, or Firm—Barnes & Thornburg

[57] ABSTRACT

A system for controlling at least one variable influencing the drive torque of an internal combustion engine of a motor vehicle, with an electronic throttle control, an electronic ignition timing control and a control device which becomes active when there is a tendency to spin of at least one driven wheel. The instantaneous engine speed is stored and the drive torque reduced to a certain value, assigned to the engine speed, and subsequently increased again, at a rate of rise dependent on the engine speed, when the tendency of spin of the driven wheel subsides. Consequently, major excess torque are avoided and greater traction and lateral control force is achieved.

12 Claims, 2 Drawing Sheets

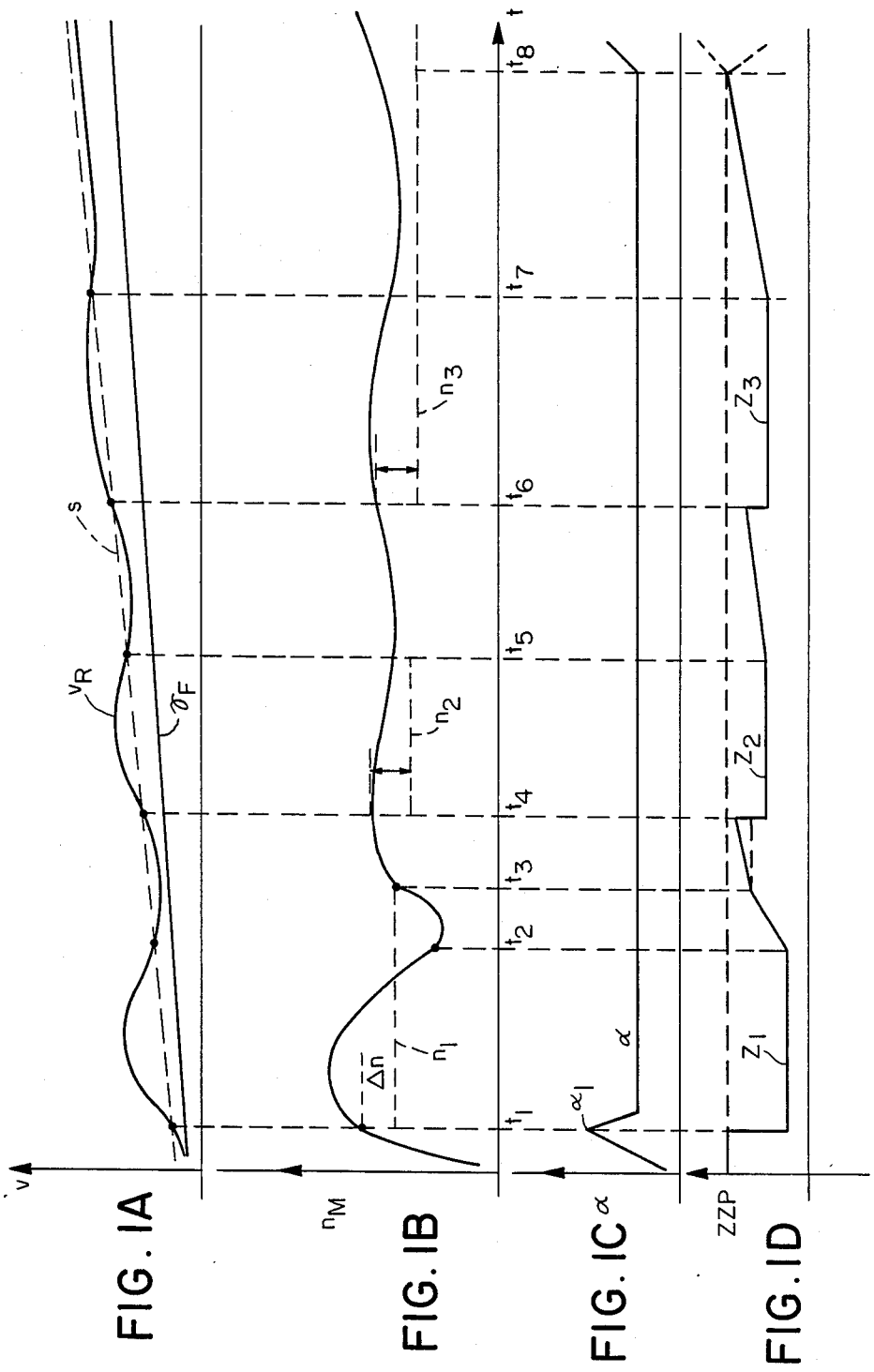

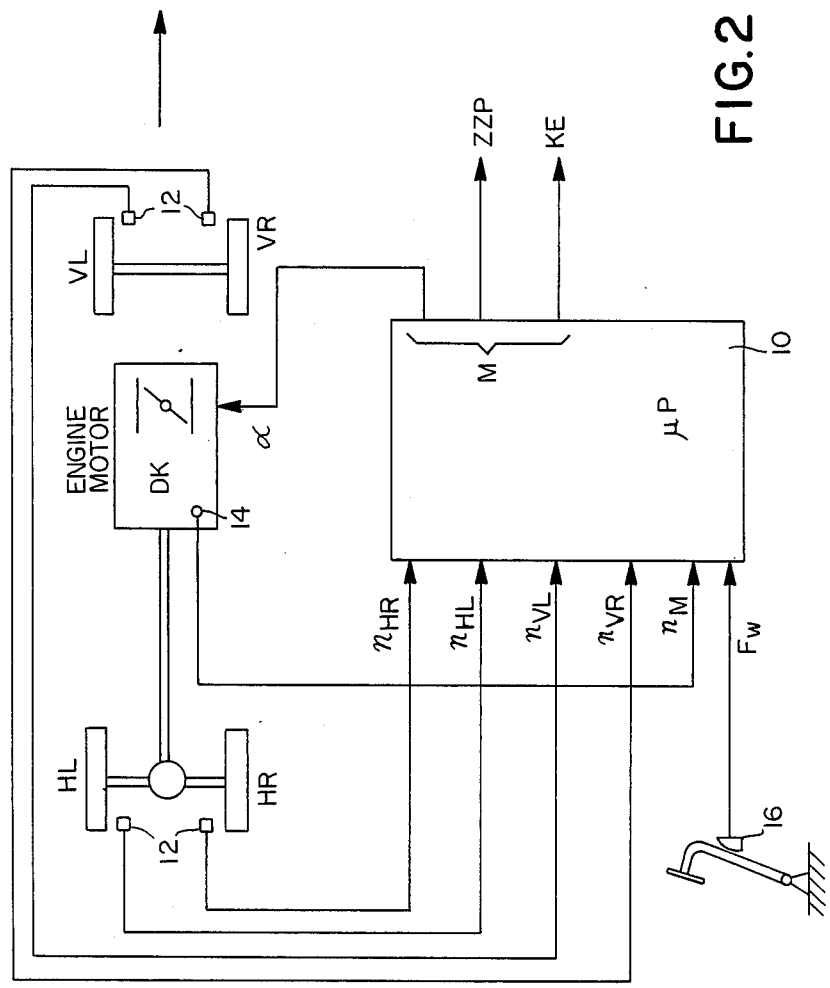

SYSTEM FOR CONTROLLING AT LEAST ONE VARIABLE INFLUENCING THE DRIVE TORQUE OF AN INTERNAL COMBUSTION ENGINE OF A MOTOR VEHICLE

BACKGROUND AND SUMMARY OF THE INVENTION

The invention relates to a system for controlling at least one variable influencing the drive torque of an internal combustion engine of a motor vehicle.

Known wheel slip or drive torque control systems use slip or acceleration of the driven wheels as controlled variable. Throttle, ignition, fuel injection or wheel brake pressure are influenced by this controlled variable in a known way. Due to charge cycle processes and torsional stresses in the drive train between engine and driven wheels, when the throttle position is constant, for example, the drive torque and the engine speed are not constant and nor is the phase of the engine speed and speed of the driven wheels constant with respect to each other. Furthermore, a large time delay in the change of drive torque must be allowed for, in particular when modifying the throttle angle in spark-ignition engines.

For these reasons, very rapid, large system deviations may be produced by drive torque excess, which can lead to considerable losses in traction and lateral control force. Drive torque control systems are therefore extremely sensitive to excessive driving forces. Consequently, it is of great significance to keep the rate of rise and the excess of the drive torque small in the range in which the driven wheels enter the unstable range after exceeding the micro-slip curve.

In copending U.S. patent application Ser. No. 136,931, filed Dec. 23, 1987, a drive torque excess is modified by the drive torque being increased in portions at the instigation of the driver and, in the event of instabilities occurring when a wheel slip control is in operation, a further increase is inhibited. However, due to a time delay i.e., until the engine responds, for example, to a change in the throttle position, an undesirably high excess torque can still build up. to which the stresses in the drive train can also contribute.

Against this background, the object of the invention is to create a system for controlling the drive torque, by which undesirably high excess torques can be avoided.

This object is achieved according to the invention for spark-ignition engines and for diesel engines. Accordingly, as well as the controlled variable derived from the driven wheels, the engine speed is also used as additional input variable, in order to register the time delays of phase shifts between engine and driven wheels.

This is achieved in that, whenever a predetermined threshold value is exceeded by the controlled variable of a driven wheel, the drive torque is reduced to a value assigned to the engine speed at this instant, and additionally by a further component, which happens in different ways in spark-ignition and diesel engines. During the further course of the control process, the drive torque is then controlled according to a predetermined variation over time of the engine speed such that smallest possible system deviations and excess torques occur and thus a maximum of traction and lateral control force is achieved.

A further advantage of the control system according to the invention, incorporating the engine speed, in that, by modification of the ignition point or of the fuel injection quantity, the speed level can be modified very quickly and thus the controlled variable of the driven wheels can be modified rapidly.

This is of advantage in particular if the drive torque is to be adapted quickly, for example, when there is a sudden increase in the adhesion coefficient, in order to achieve optimum traction.

The exemplary embodiment relates to a motor vehicle with a carburetor engine.

Other objects, advantages and novel features of the present invention will become apparent from the following detailed description of the invention when considered in conjunction with the accompanying drawing.

BRIEF DESCRIPTION OF THE DRAWINGS

FIG. 1 shows the variations over time of various variables are represented, as explained in detail below.

In diagram A, the variation in the increasing vehicle velocity $v_F$ and of a threshold value S derived therefrom, for example of a certain slip, as well as the velocity $v_R$ of a driven vehicle wheel are shown.

In diagram B, the variation in engine speed $n_M$ over time t is shown.

In diagram C, the variation over time in the throttle angle $\alpha$ is shown.

In diagram D, the variation over time in the ignition point ZZP is shown.

FIG. 2 shows a block diagram of a system capable of operating according to the principles of the present invention.

DETAILED DESCRIPTION OF THE DRAWINGS

The mode of operation of the system according to the invention is described with reference to these four diagrams of FIG. 1. It is assumed that the motor vehicle is in a starting phase shortly after commencing driving on a wet or slippery surface. After increasing the throttle angle $\alpha$, the engine speed $n_M$ increases, the wheels begin to turn and the vehicle moves. At the time $t_1$, a driven vehicle wheel exceeds the predetermined threshold value S (diagram A). The engine speed $n_M$ (diagram B) measured at this instant is reduced by a certain component $\Delta n$, which may depend on a variable, for example the vehicle velocity $v_F$ or the vehicle acceleration, and this value $n_1$, which is represented by a horizontal broken line, is stored.

At the same time $t_1$, the drive torque is reduced, by reduction of the throttle angle $\alpha$ to a value $\alpha 1$ (diagram C), to a value assigned to the stored engine speed value $n_1$ or the vehicle acceleration. This value determines a drive torque which is somewhat smaller than that at which the driven wheel has exceeded the predetermined threshold value S and threatened to become unstable. In addition to this reduction, the drive torque is reduced at time $t_1$ by a further value or component, by the ignition point ZZP being adjusted, in the direction of retarded ignition, correspondingly to a certain value $Z_1$. In the following control sequence, this measure makes possible a rapid adaptation of the drive torque to a desired engine speed variation with respect to the variation in the controlled variable. This additional drive torque reduction may be greater in the first control cycle than in the following control cycles, since experience shows that the excess torque is then at its greatest, assuming an active control system. It can be modified depending on the vehicle velocity $v_F$, for example, to become less with increasing vehicle velocity, as in this case the engine excess torque becomes smaller.

In the following control sequence, the throttle is kept constant at the set value $\alpha_1$ and the control is effected exclusively by a modification of the ignition point, until a predetermined ignition point value is achieved, which is explained later.

The drive torque reduction at the time $t_1$ has the effect that, after an overshoot, the engine speed becomes lower and also the velocity $v_R$ of the driven wheel becomes lower and, at the time $t_2$, drops below the threshold value S. At this time, the engine speed $n_M$ is already below the stored value $n_1$. As long as this is the case, the ignition point is adjusted in the direction of advanced ignition by a predetermined increase assigned to a certain rate of rise of the engine speed $n_M$, until the value $n_1$ is exceeded (at time $t_2$). Subsequently, the ignition point is further adjusted in the direction of advanced ignition by a likewise predetermined increase, assigned to a lower rate of rise of the engine speed $n_M$, until either a reasonable limit is reached (shown at time $t_8$) and a further drive torque increase takes place via an adjustment of the throttle angle or until (at time $t_4$) the velocity $v_R$ of the driven wheel once again exceeds the threshold value S.

At time $t_4$, a new control cycle begins with exceeding of the threshold value S by $v_R$. A value $n_2$ is stored, assigned to the measured engine speed $n_M$ and now reduced by a smaller component. An ignition point is reverted to a value $Z_2$, the throttle being kept unmodified at the value $_1$, as the ignition point limit value, represented in diagram D as a broken line, had not yet been reached.

This setting remains constant until the wheel velocity $v_R$ drops below the threshold value S at time $t_5$.

As the engine speed $n_M$ is above the stored value $n_2$ at this instant, the ignition point is now raised with the lesser increase, until the threshold value S is again exceeded at time $t_6$ and a new control cycle, now with $n_3$ and $Z_3$, begins etc. At time $t_8$, as already indicated, the ignition point limit value is exceeded, whereupon an increase in the throttle angle takes place. This may entail a lowering of the ignition point in order to gain further scope for a continuation of the rapid control. This lowering may also be a function of the wheel acceleration or of the wheel-vehicle differential acceleration.

As already mentioned, both the component by which the measured engine speed is reduced before storage and the component by which the drive torque is reduced when the threshold value is exceeded, can be modified like the predetermined rapid and slow increase in the ignition point values, depending on the engine speed and/or the vehicle velocity, which is not represented however in the diagrams A to D.

A system according to the invention can be represented essentially of one or more correspondingly programmed microprocessors 10 which receive their input signals from sensor 2 at the wheels which and emit their output signals n of rotational wheel rotational speed, engine speed $n_M$ from sensor 14 and accelerator pedal position $F_w$ from sensor 16 as illustrated in FIG. 2. The microprocessor is programmed to perform the above described process and product output signals for total torque M, including throttle valve angle $\alpha$, fuel injection quantity KE and ignition point timing ZZP, via switching or control amplifiers to electronic throttle DK or injection controls and a likewise electronic ignition point control. It is possible for a person skilled in the art to construct such a system without himself performing an inventive step.

The operations, control and process described herein may be performed by a system in copending U.S. patent application Ser. No. 136,931, filed Dec. 23, 1987 now U.S. Pat. No. 4,785,904, and incorporated herein by reference, with minor modifications.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. System for controlling at least one variable influencing the drive torque of a spark-ignition internal combustion engine of a motor vehicle, having an electronic throttle control, having an electronic ignition timing control with a sensor for the engine speed, and having a control means for controlling at least one variable influencing the drive torque whenever at least one driven wheel of the motor vehicle tends to spin, wherein said control means:

whenever a predetermined threshold value is exceeded by a preselected variable of a driven wheel, (a) reduces the instantaneous value of engine speed by a certain amount and stores the reduced value, of the engine speed; (b) reducing the drive torque by modification of the throttle angle or of the fuel injection quantity to a value assigned to the stored value of the engine speed; and, (c) reduces the drive torque additionally by modification of the ignition point by a certain predetermined value; and whenever the preselected variable drops below the predetermined threshold value, (a) increases the drive torque by initially increasing the ignition point at most as far as a predetermined value (1) at a rate of rise effecting a predetermined rapid rate of rise of the engine speed, as long as the engine speed is below the stored value; and (2) at a rate of rise effecting a predetermined slow rate of rise of the engine speed as soon as the engine speed has exceeded the stored value; and (b) subsequently increasing the throttle angle or the fuel injection quantity until either the value of the drive torque predetermined by an accelerator pedal is reached or once again the predetermined threshold value is exceeded by the preselected variable.

2. System according to claim 1, including means for modifying the certain amount by which the engine speed is reduced before storage as a function of the vehicle velocity.

3. System according to claim 1, wherein said control means reduces the drive torque whenever the predetermined threshold value is exceeded by the preselected variable by said certain predetermined value which is greater during the first control cycle than during the following control cycles.

4. System according to claim 3, including means for modifying the certain predetermined value of torque reduction as a function of the vehicle velocity.

5. System according to claim 1, including means for modifying the predetermined rates of rise of the engine speed as a function of at least the engine speed.

6. System according to claim 1, including means for modifying the predetermined rates of rise of the engine speed as a function of the vehicle velocity.

7. System for controlling at least one variable influencing the drive torque of an internal combustion diesel engine of a motor vehicle, having a sensor for the engine speed and having a control means for controlling at least one variable influencing the drive torque whenever at least one driven wheel of the motor vehicle tends to spin, wherein said control means:

whenever the predetermined threshold value is exceeded by a preselected variable, (a) reduces the instantaneous value of the engine speed by a certain amount and stores the reduced engine speed; (b) reduces the drive torque by modification of the fuel injection quantity to a value assigned to the stored value of the engine speed; and (c) reduces the drive torque additionally by modification of the ignition point by a certain predetermined value; and whenever the preselected variable drops below the predetermined threshold value, increases the drive torque by increasing the fuel injection quantity (1) at a rate of rise effecting a predetermined rapid rate of rise of the engine speed as long as the engine speed is below the stored value, and (2) at a rate of rise effecting a predetermined slow rate of rise of the engine speed as soon as the engine speed has exceeded the stored value, until either the value of the drive torque predetermined by an accelerator pedal is reached or once again the predetermined threshold value is exceeded by the preselected variable.

8. System according to claim 7, including means for modifying the certain amount by which the engine speed is reduced before storage as a function of the vehicle velocity.

9. System according to claim 7, wherein said control means reduces the drive torque whenever the predetermined threshold value is exceeded by the preselected variable by said certain predetermined value which is greater during the first control cycle than during the following control cycles.

10. System according to claim 9, including means for modifying the certain predetermined value of torque reduction as a function of the vehicle velocity.

11. System according to claim 7, including means for modifying the predetermined rates of rise of the engine speed as a function of at least the engine speed.

12. System according to claim 7, including means for modifying the predetermined rates of rise of the engine speed as a function of the vehicle velocity.

* * * * *